United States Patent
Myers

(10) Patent No.: US 10,848,388 B1
(45) Date of Patent: Nov. 24, 2020

(54) DISTRIBUTED COMPUTING FRAMEWORK

(71) Applicant: Deloitte Development LLC, Hermitage, TN (US)

(72) Inventor: Adrian Bartholomew Myers, North Potomac, MD (US)

(73) Assignee: Deloitte Development LLC, Hermitage, TN (US)

( * ) Notice: Subject to any disclaimer, the term of this patent is extended or adjusted under 35 U.S.C. 154(b) by 0 days.

(21) Appl. No.: 16/510,305

(22) Filed: Jul. 12, 2019

(51) Int. Cl.
*H04L 12/24* (2006.01)
*H04L 29/08* (2006.01)

(52) U.S. Cl.
CPC ............ H04L 41/145 (2013.01); H04L 67/10 (2013.01); H04L 67/1095 (2013.01); *H04Q 2213/13544* (2013.01)

(58) Field of Classification Search
CPC ....... H04L 41/14; H04L 41/145; H04L 67/10; H04L 67/1095; H04W 16/22; H04Q 2213/13544; Y10S 706/92
See application file for complete search history.

(56) References Cited

U.S. PATENT DOCUMENTS

| | | | | |
|---|---|---|---|---|
| 6,134,514 | A * | 10/2000 | Liu | H04L 41/145 703/17 |
| 8,104,043 | B2 * | 1/2012 | Padisetty | H04L 67/10 718/100 |
| 8,612,580 | B2 * | 12/2013 | Gandhi | G06F 9/5027 709/224 |
| 8,839,114 | B1 * | 9/2014 | Glendinning | H04L 41/145 715/735 |
| 2006/0009207 | A1 * | 1/2006 | Chen | H04W 60/00 455/422.1 |
| 2006/0064295 | A1 * | 3/2006 | Schwaiger | G06Q 30/02 703/22 |
| 2006/0274659 | A1 * | 12/2006 | Ouderkirk | H04L 41/145 370/241 |
| 2007/0043752 | A1 * | 2/2007 | Zacharla | H04L 41/085 |

(Continued)

OTHER PUBLICATIONS

Klefstad et al., "A Distributed, Scalable, and Synchronized Framework for Large-Scale Microscopic Traffic Simulation," 2005, In Proc. of 8th International IEEE Conference on Intelligent Transportation Systems (Year: 2005).*

(Continued)

*Primary Examiner* — Aaron N Strange
(74) *Attorney, Agent, or Firm* — Fish & Richardson P.C.

(57) ABSTRACT

A system comprises a seed node, one or more compute servers and a controller server. The seed node generates initial conditions for a computational process representing an environment having one or more layers with agents. Each compute server executes tasks to generate a portion of the environment. The controller server receives initial conditions of the environment from the seed node; determines a distribution of tasks for the computational process among the compute servers; and sends instructions to each compute server for execution of tasks determined for the respective compute server. The controller server measures an execution time period for the computational process in units of discrete time frames, and sends an update or synchronization instructions, or both, to one or more compute servers in each time frame.

49 Claims, 6 Drawing Sheets

(56) References Cited

U.S. PATENT DOCUMENTS

| | | | | |
|---|---|---|---|---|
| 2011/0202329 A1* | 8/2011 | Goodnight | ............. | G06F 17/16 703/21 |
| 2013/0085740 A1* | 4/2013 | Booch | .................... | G06F 30/20 703/17 |
| 2014/0074749 A1* | 3/2014 | Flores | ................ | G06Q 10/067 705/348 |
| 2015/0134695 A1* | 5/2015 | Zhao | ....................... | G06F 16/24 707/769 |
| 2016/0065493 A1* | 3/2016 | Bargagni | ................ | H04L 67/06 709/223 |
| 2017/0063985 A1* | 3/2017 | Xun | ..................... | H04J 3/0667 |
| 2018/0285766 A1* | 10/2018 | Shen | ................... | H04L 67/2833 |
| 2019/0215766 A1* | 7/2019 | Wu | ...................... | H04W 36/16 |
| 2019/0228338 A1* | 7/2019 | Chapman | ............... | G06N 20/20 |

OTHER PUBLICATIONS

Rao et al., "An ultra-large-scale simulation framework," 2002, Journal of Parallel Distributed Computing 62, pp. 1670-1693 (Year: 2002).*

Casanova et al., "SimGrid: a Generic Framework for Large-Scale Distributed Experiments," 2008, In Proc. of 10th IEEE International Conference on Computer Modeling and Simulation (Year: 2008).*

* cited by examiner

DISTRIBUTED COMPUTING FRAMEWORK

TECHNICAL FIELD

The following disclosure relates generally to a distributed computing framework, and in particular, to systems, devices and methods related to a distributed computing framework for massive scale simulations.

BACKGROUND

Computer simulation frameworks are used as analytic platforms for realizing virtual scenarios corresponding to potential real world events, and estimating effects of different responses to these scenarios. The simulation frameworks are implemented using a combination of hardware, e.g., servers and client computers, and software that runs on the hardware. Conventional simulation frameworks often utilize hardware or software, or both, from particular vendors that make portability of these tools difficult, and also limit the computational power of these tools, leading to performance and scalability challenges for simulating scenarios with very large populations.

SUMMARY

The present disclosure describes systems, devices and methods related to a distributed computing framework for massive scale simulations of scenarios to represent real world events. In some implementations, the distributed computing framework includes a seed node, a controller server and a plurality of compute servers. The seed node is realized as one or more software programs running on a computing device and is used to generate initial conditions for a simulation. The controller server monitors and manages the overall state of the simulation: the controller server receives data about initial conditions of the simulation from the seed node; determines a distribution of tasks for the simulation among the compute servers; and sends messages to the compute servers with instructions to execute the respectively assigned tasks. The controller server also coordinates the operations of the compute servers by sending instructions for state updates and state synchronization at a fixed time step, which is also referred to as a time frame or framerate, while the simulation is in progress. The controller server also updates the distribution of tasks among the compute nodes at certain time intervals during the simulation. Each compute server executes respectively assigned tasks in accordance with instructions received from the controller server, generating a portion of an overall environment for the simulation that represents a real world scenario being simulated. Each compute server also updates state of its respective environment portion and synchronizes the updated state with neighboring compute servers in each time frame in accordance with instructions from the controller server.

In some implementations, the distributed computing framework also includes a client device that connects to the controller server and one or more of the compute servers. The client device provides a user interface that enables a user to visualize, or interact with, or both, the simulation environment during execution. In some implementations, the client device provides a second user interface that presents performance metrics of the distributed computing framework during execution of the simulation.

In this context, a simulation refers to an approximate imitation of the operation of a process or system. A model of the process or system is developed for the simulation. The model provides a well-defined description of the simulated subject, e.g., process or system, and represents key characteristics, e.g., type or behavior of agents in the environment, tasks and abstract or physical properties. An agent is a discrete actor in the simulation, realized by the simulation code, which encapsulates decision-making logic allowing the agent to respond to and to modify its state and the state of the environment. The model represents the system itself, whereas the simulation represents the operation of the model over time.

In a general aspect, a system comprises a seed node, one or more compute servers that are communicably coupled to one another and a controller server that is communicably coupled to the seed node and the one or more compute servers. The seed node generates initial conditions for a computational process representing an environment having one or more layers, each layer of the one or more layers including agents sharing a common characteristic that is different from characteristics shared by agents in other layers. Each compute server of the one or more compute servers executes tasks to generate a portion of the environment. The controller server receives, from the seed node, information about initial conditions of the environment, the information including initial conditions of the one or more layers; analyzing the information about initial conditions of the environment. In response to the analysis, the controller server determines a distribution of the tasks corresponding to the computational process among the one or more compute servers. The controller server sends, to each compute server of the one or more compute servers, instructions for execution of tasks corresponding to a respective portion of the environment determined for the respective compute server. The controller server measures, using a system clock, an execution time period for the computational process, wherein the execution time period is measured in units of discrete time frames. The controller server determines start of each time frame. At the start of each time frame, the controller server sends, to each of the one or more compute servers, an update instruction to update execution state of respective portion of the environment. The controller server receives, from each of the one or more compute servers, a first response indicating completion of respective update. Upon receiving a first response from each of the one or more compute servers, the controller server sends, to each of the one or more compute servers, a synchronization instruction to synchronize state of respective portion of the environment with other compute servers. The controller server receives, from each of the one or more compute servers, a subsequent response indicating completion of respective synchronization. The operations by the controller server generate, at a known stage of the computational process and in each iteration of the computational process, an identical result that is independent of a sequential order of receiving the first responses or the subsequent responses from the one or more compute servers.

Implementations of the above techniques include methods, apparatus, systems and computer program products. One such computer program product is suitably embodied in a non-transitory machine-readable medium that stores instructions executable by one or more processors. The instructions are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

Figure 1:
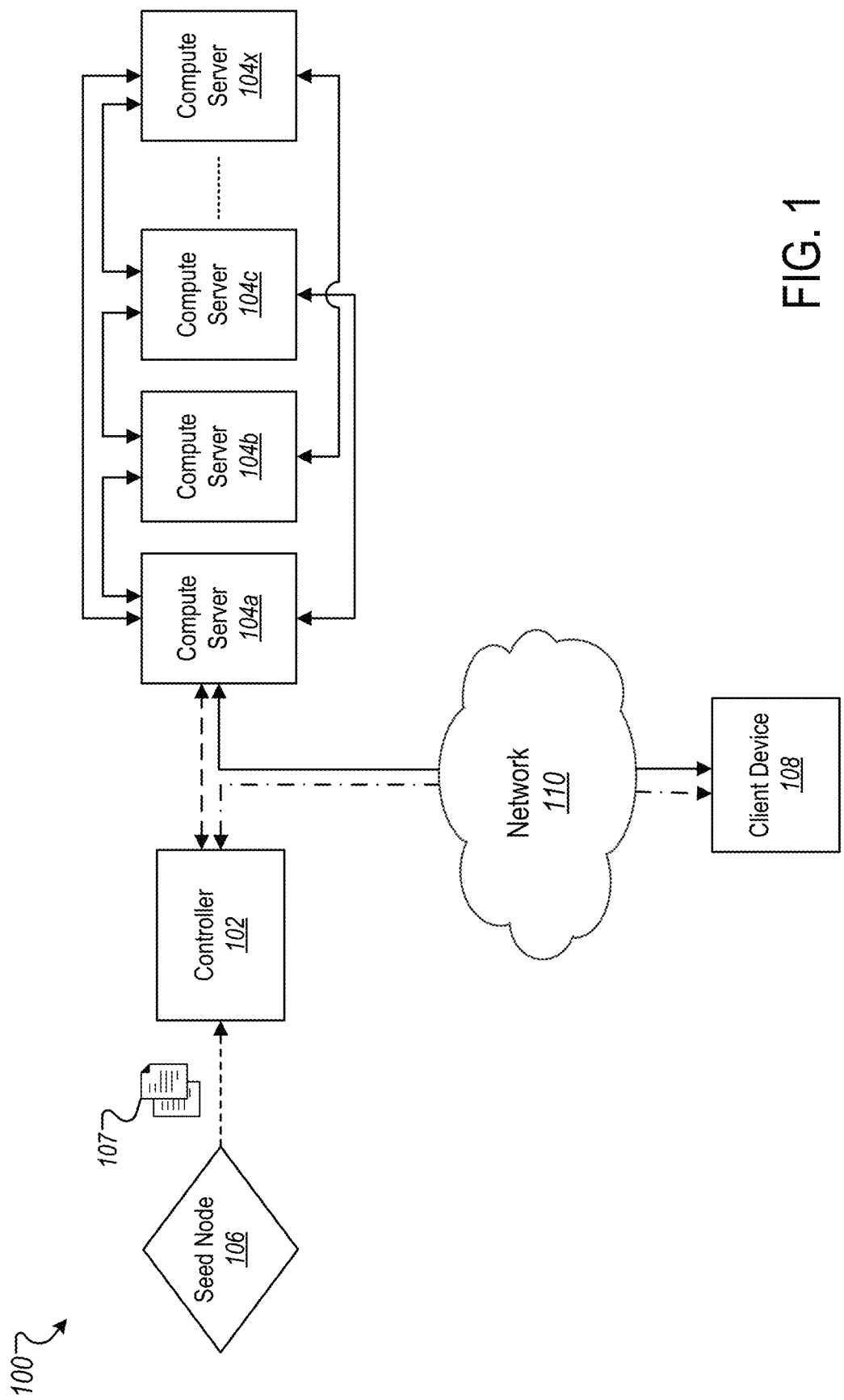
FIG. 1 illustrates an example of a system that provides a distributed computing framework for massive scale simulations.

Using the novel features described in the following sections of this specification, a series of applications running on one or more connected devices can be used to form a runtime distributed computing framework that can power simulations tailored to the needs of a specific client or project. The distributed computing framework can be formed in a cloud-agnostic manner, with the constituent devices being either co-located or geographically distributed, being connected to one another over public or private communications networks, or both. The distributed computing framework is built to be portable to different operating system platforms, having limited internal or external dependencies. This allows the distributed computing framework to be ported to run in any cloud, as the framework does not require a specific feature or application from any technology provider to function, nor does it depend on a library or other framework which could add a dependency of its own, e.g., by requiring additional complex frameworks to be installed alongside. The distributed computing framework is also independent of third party vendor applications. The lack of external dependencies or reliance on vendor-specific technology facilitates use of the distributed computing framework in sensitive situations that require minimal or no third party software, e.g., in secure situations that feature several security restrictions that limit what a program can do, no public internet access, fewer or severely restricted versions of repositories, or services run privately. For example, the distributed computing framework can be deployed in defense or intelligence applications, or used in government agencies. The lack of external dependencies or reliance on vendor-specific technology also presents a cleaner and more readily extensible codebase to developers, and greatly improves performance, compared to conventional simulation tools.

The distributed computing framework provides determinism that is powered by a system-wide clock. In doing so, in some implementations, a simulation can be run multiple times, with various runs of the simulation producing same results at a given time frame. This is useful to allow users to keep initial conditions constant and make strategic changes while the simulation is running, such that new outcomes in the simulation are driven by user-initiated changes and not by chance. As a result, the simulations can be shared and replayed or interacted with meaningfully. The system-wide shared clock also enables regular system-wide state snapshots of the simulation environment, which makes recovery from crashes or historical analysis, or both, easier. The system-wide clock also enables imposition of a simple and uniform structure on communications between the applications running on different devices, which makes the simulations more portable while also allowing the framework to be optimized around dense, regular messages that can be sent and processed efficiently.

The distributed computing framework is built handle a large number of the compute servers that interact with one another at high frequencies, with a flexible connection to the client device. In some implementations, the number of compute servers are limited by the constraints of the underlying hardware resources, e.g., available memory of the server computers. The ability to handle a large number of compute servers enables the distributed computing framework to handle simulations that have much higher density or complexity, or both, compared to conventional simulation frameworks. Accordingly, the distributed computing framework can scale to simulations with very large populations of simulated agents, in a space of any number of dimensions, and perform such simulations efficiently.

FIG. 1 illustrates an example of a system 100 that provides a distributed computing framework for massive scale simulations. The system 100 includes a controller server 102, a plurality of compute servers 104a, 104b, 104c, . . . , 104x (collectively, compute servers 104a-104x) and a seed node 106. In some implementations, the system 100 also includes a client device 108 that is connected to one or more of the controller server 102 and the compute servers 104a-104x through a network 110.

The controller server 102, the compute servers 104a-104x and the seed node 106 form the distributed computing framework that is used to run massive scale simulations, e.g., computer processes representing real world scenarios with very large populations of agents, or very dense populations of agents, or both. The client device 108 is also a part of the distributed computing framework, and provides a user interface to facilitate interaction of a user with the simulation environment. In this context, the environment corresponds to the software realization of a real world scenario that is being simulated. For example, a simulation can be to analyze design and performance of a cellular communications network having cell towers and mobile phones. In this case, the simulated environment can be a software realization, in the distributed computing framework, of a geographic area that represents a coverage area of the cellular communications network, with the geographic area including one or more cell towers connecting a plurality of mobile phones within the coverage area.

In some implementations, the seed node 106 is realized as a software program running on a computer device that generates initial conditions for a simulation. The seed node 106 receives, e.g., from a user through the user interface provided by the client device 108, description of an environment to be represented by the simulation, and determines parameters to create the environment when computational processes for the simulation are executed by the controller server 102 and the compute servers 104a-104x. For example, the simulation can be for the cellular communications network example noted above. In this case, the seed node 106 generates parameters for the simulation specifying one or more of the numbers of cell towers and mobile phones; cellular technologies supported by the cell towers and the mobile phones; a geographic area for the cellular communications network; or a distribution of the cell towers and mobile phones across the geographic area, among other parameters. The seed node 106 sends the parameters to the controller server 102 in messages 107 as initial conditions for the simulation.

In some implementations, the controller server 102 is a server that performs operations to manage the overall system state of a simulation or monitor performance of the simulation, or both. The controller server 102 receives data for the initial conditions from the seed node 106, and analyzes the initial conditions to determine a distribution of the simulation tasks and parameters among the compute servers 104a-104x. Upon determining the distribution of the simulation tasks and parameters, the controller 102 sends, to each of the compute servers, respective instructions for creating a respective portion of the simulated environment. For example, for the cellular communications network simulation described above, the controller server 102 can determine a portion of the network/geographic area to be simulated by each of the compute servers, corresponding numbers of cell towers and mobile phones in the respective sections, and cellular technologies to be supported by the cell towers and mobile phones in the respective portion. Following the determination, the controller 102 sends, to each of the compute servers 104a-104x, instructions and parameters for simulating the respective portion.

In addition to distributing simulation tasks among the compute servers, in some implementations, the controller server 102 also sends periodic instructions, e.g., once every time frame, to the compute servers to update respective simulation states, and to synchronize the simulation state of each compute server with the other compute servers. In some implementations, the controller server 102 also performs load balancing during execution of the simulation, e.g., by redistributing the simulation tasks and parameters among the compute servers. The above operations of the controller 102 are described in greater detail in the following sections.

In some implementations, each of the compute servers 104a-104x is a server that performs operations to execute tasks for the simulation that are allocated to the compute server. By executing the allocated tasks, each compute server generates the respective portion of the simulated environment. In each time frame, each compute server updates the state of the respective portion of the simulated environment, e.g., action events, configuration of agents in the respective portion or interaction among the agents, or both, e.g., upon receiving state update instructions from the controller 102. For example, for the cellular communications network simulation described above, a compute server, e.g., compute server 104a, performs message exchanges between one or more cell towers and mobile phones in its respective portion of the simulated environment in a time frame upon receiving an update instruction from the controller 102.

In some implementations, each compute server also broadcasts the state of the respective portion of the simulated environment to all neighboring compute servers, e.g., compute servers with a shared boundary, upon receiving synchronization update instructions from the controller 102. In some implementations, each compute server broadcasts the state of the respective portion of the simulated environment to all other compute servers, e.g., upon receiving synchronization update instructions from the controller 102. In this manner, all compute servers have a consistent view of the simulated environment. Each compute server takes into account the states of the portions of the simulated environment generated by other compute servers in the present time frame when the compute server updates the respective portion of the environment in the next time frame.

In some implementations, one or more of the compute servers 104a-104x implement artificial intelligence (AI) techniques. In such implementations, the compute servers 104a-104x use the AI techniques to process the simulation tasks. The operations of the compute servers are described in greater detail in the following sections.

In some implementations, the client device 108 provides a user interface that enables a user to visualize, or interact with, or both, the simulation environment during execution. In some implementations, the user interface allows real time visualization and interaction with the simulation. The user interface enables a user to visualize the simulated environment, including one or more agents in the environment and interactions between the agents, e.g., exchange of messages, as the simulation progresses. In some implementations, the user interface enables a user to change the visualization area. For example, the user interface can be "zoomed out" to enable visualization of the overall geographic area covered by a simulation, or can be "zoomed in" to a local area, depending on the objectives of the user.

The client device 108 connects to the controller server 102 or one or more of the compute servers 104a-104x, or any suitable combination of these, over the network 110. In some implementations, the client device 108 provides a user interface, e.g., a dashboard, which connects to the controller server 102 and presents a visualization of overall system performance during execution of the simulation. In some implementations, the dashboard is provided by a second client device.

In some implementations, the seed node 106, the controller server 102, and each of the compute servers 104a-104x are realized on separate hardware devices that are connected to one another through network connections. In some implementations, a plurality of the compute servers 104a-104x are realized as applications running on the same device, which are connected to the seed node, the controller server and to other compute servers through network connections. In some other implementations, the seed node 106, the controller server 102 and one or more of the compute servers 104a-104x are realized as discrete applications running on the same hardware device. In some implementations, the seed node, the controller server 102, and one or more of the compute servers 104a-104x, the devices are co-located in one physical location. For example, the seed node, the controller server and the compute servers could be run on a simple in-office cluster, or on one or two personal computers of a user. In some other implementations, the devices are geographically distributed across multiple physical locations.

Accordingly, as noted previously, the distributed computing framework is built in a cloud-agnostic manner. In other words, the framework is built to be portable to different operating system platforms, having limited internal or external dependencies. The distributed computing framework is also independent of third party vendor applications. The lack of external dependencies or reliance on vendor-specific technology facilitate use of the distributed computing framework in sensitive situations, such as defense or intelligence applications, or by use in government agencies. Without external dependencies or reliance on vendor-specific technology, the distributed computing framework also presents a cleaner and more readily extensible codebase to developers, and greatly improves performance, compared to conventional simulation tools.

In some implementations, the network 110 is a public network, e.g., the Internet, through which the client device 108, which can be at a remote location, connects to one or more of the controller server and the compute servers. In some implementations, the network 110 is a private network, e.g., a firewalled enterprise network. In such cases, the distributed computing framework is accessible to client devices that connect from within the private network, while being inaccessible to other devices that are outside the private network. In some other implementations, the network 110 is a mix of a public network, e.g., the Internet, and a private network, e.g., an enterprise network. In such cases, some sections of the distributed computing framework, e.g., the controller server 102 or the seed node 106, are accessible to client devices that connect through the public network, while other sections of the distributed computing framework, e.g., one or more of the compute nodes 104a-104x, are accessible to devices that connect from within the private network, but inaccessible to devices connecting through the public network.

In some implementations, the client device 108 connects to the controller server 102 or the compute servers 104a-104x, or any combination of these, using a socket connection over the network 110. In some implementations, the dashboard interface is realized using Hypertext Markup Language (HTML) or JavaScript (JS) or both, and the dashboard interface connects to the controller server 102 through a HyperText Transfer Protocol (HTTP) Representational State Transfer (REST) connection over the network 110.

In some implementations, the system 100 includes additional components for the distributed computing framework, such as a service discovery feature that allows the seed node, the controller server and the compute servers to find one another. When the distributed computing framework is booted up, the controller server 102 is initialized, providing its connection information, e.g., network address, to a network data storage location that is known to other system components. Subsequently, one or more of the compute servers 104a-104x are run. A compute server, e.g., compute server 104a, upon powering on, reads the network data storage location to obtain the network address of the controller server 102. The compute server can then use the obtained network address to connect to the controller server 102. Such a service discovery feature allows compute servers 104a-104x to connect to the controller server 102 and then receive instructions from the controller server 102 to coordinate with one another. The service discovery feature also allows client device 108 to connect to any ongoing simulation session; or a persistent network data storage resource, such as a network file system (NFS) or database, to be identified by the controller server 102 and compute servers 104a-104x and used to provide data persistence to assist in data analysis or crash recovery.

In some implementations, when a simulation is started on the distributed computing framework in the system 100, the controller server 102 receives the messages 107 from the seed node 106, and obtains the initial conditions for the simulation by reading the messages 107. Upon analyzing the initial conditions, the controller server 102 partitions the simulated environment into portions, which are each allocated to a compute server. For an environment that represents a geographic area, the portions of the environment corresponding to discrete regions of the geographic area.

In some implementations, the simulated environment is composed of a plurality of layers, where each layer includes agents and functions sharing some common characteristics that are different from the characteristics of agents and functions in other layers. In this context, characteristics can be, for example, an agent type or a particular function, among others. For example, considering the cellular communications network simulation described above, the simulated environment includes at least two layers, with one layer including the cell towers and corresponding functions (the common characteristic being, for example, same type of agents in the layer, e.g., cell towers), and a second layer including the mobile phones and corresponding functions (the common characteristic being, for example, same type of agents in the layer, e.g., mobile phones). The messages 107 specify initial conditions for each layer of the simulated environment. The controller server 102 partitions, according to a range of rules governing the simulation, each layer into portions that are allocated to the different compute servers.

In some implementations, the controller server 102 partitions each layer independent of other layers. In such cases, a layer can be partitioned into a number of portions that is different from the number of portions in which another layer of the simulated environment is partitioned. For example, in the cellular communications network simulation, the controller server 102 can partition the cell tower layer into three portions, but partition the mobile phone layer into five portions. In some other implementations, the partitions for different layers are consistent across layers. In such cases, different layers can be partitioned into same number of portions. For example, in the cellular communications network simulation, the controller server 102 can partition each of the cell tower layer and the mobile phone layer into three portions.

In some implementations, the controller server 102 allocates partitions of different layers to different subsets of compute servers. For example, in such implementations, for the cellular communications network simulation, the controller server 102 can partition the cell tower layer into three portions, and allocate the three portions to compute servers 104a, 104b and 104c. The controller server 102 can also partition the mobile phone layer into three portions, but allocate the three portions to compute servers 104b, 104c and 104x. In some other implementations, the controller server 102 allocates partitions of different layers to the same subset of compute servers. For example, in such implementations, for the cellular communications network simulation, the controller server 102 can partition each of the cell tower layer and the mobile phone layer into three portions, and allocate the three portions of each layer to compute servers 104a, 104b and 104c.

The compute servers 104a-104x receive instructions from the controller server 102 with information about the respective portion of each layer that the controller server assigns to each compute server. Upon receiving the information, a compute server performs operations to simulate the respective portions of the assigned layers, and run corresponding simulation tasks. In some implementations, a compute server, e.g., any of compute servers 104a-104x, executes instructions to create a simulation layer manager, which is composed of one or more software programs with dynamic attributes, that represents each layer for which the compute server is responsible. For example, the controller server 102 can assign a portion of the cell tower layer and a portion of the mobile phone layer to the compute server 104a for the cellular communications network simulation. Upon receiving instructions with the assignment from the controller server, the compute server 104a executes instructions to create two simulation layer managers—one layer manager to represent the agents located within this compute server's designated portion of the cell tower layer, and a second layer manager to represent the agents within the designated portion of the mobile phone layer.

Figure 2A:
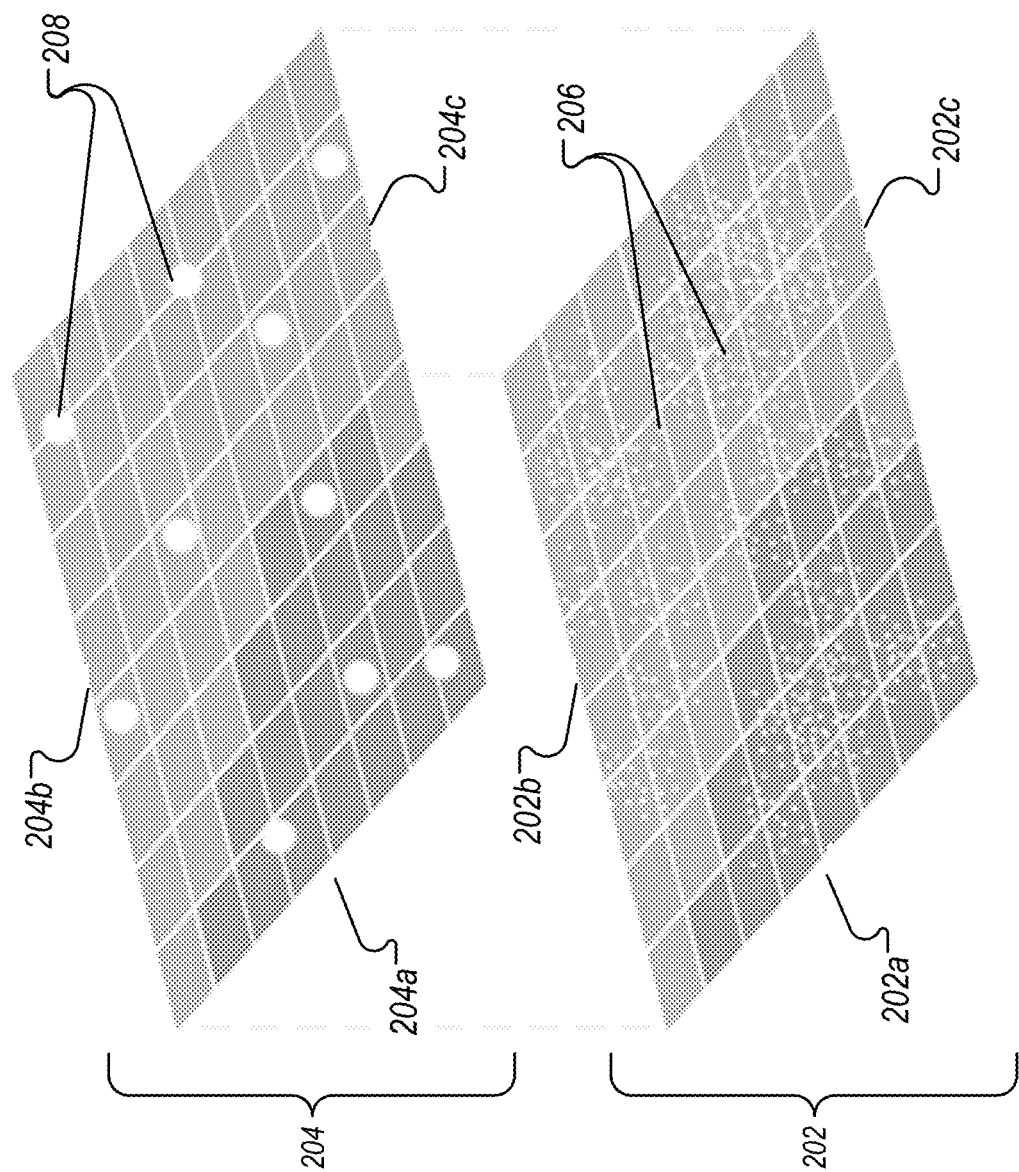
FIGS. 2A and 2B illustrate examples of layers with agents that form a simulated environment distributed among multiple compute servers.
Figure 2B:
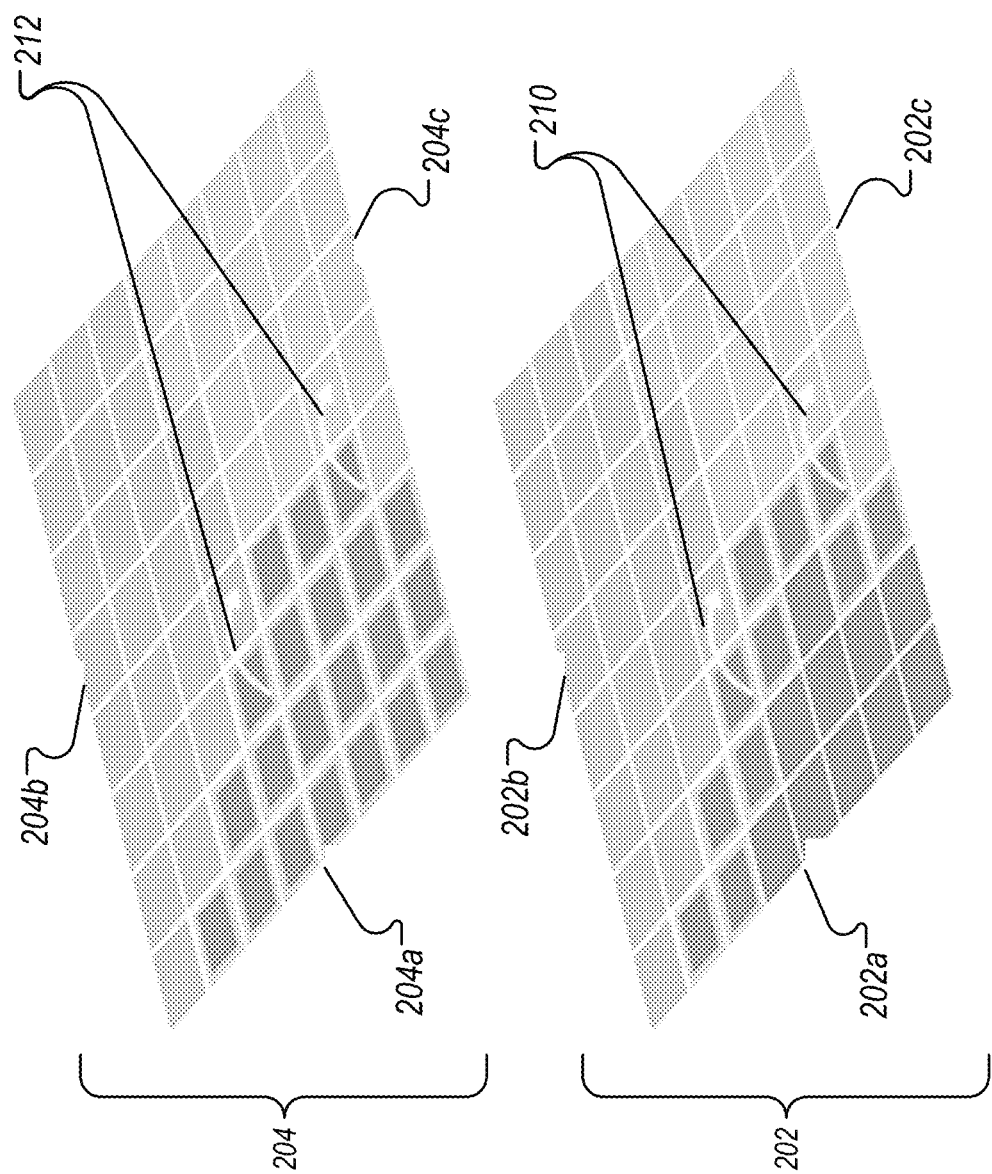

FIGS. 2A and 2B illustrate examples of layers 202 and 204 with agents that form a simulated environment distributed among multiple compute servers. In some implementations, the layers 202 and 204 are created by compute servers of the distributed computing framework in the system 100, e.g., one or more of compute servers 104a-104x. As shown in FIGS. 2A and 2B, the simulated environment is composed of the two layers 202 and 204. For example, considering the cellular communications network simulation, the environment can be composed of a mobile phone layer 202 and a cell tower layer 204. The controller server 102 partitions each of the two layers 202 and 204 into three portions, depending on the initial conditions and according to rules for the simulation, with each portion covering a discrete region of the geographic area covered by the simulated cellular network. For example, as shown, the controller server 102 divides the mobile phone layer 202 into three portions 202a, 202b and 202c, where each portion includes a plurality of mobile phone agents, collectively represented as agents 206 in FIG. 2A. The controller server 102 also divides the cell tower layer 204 into three portions 204a, 204b and 204c, where each of these portions includes a plurality of cell tower agents, collectively represented as agents 208 in FIG. 2A. Although the mobile phone layer 202 and the cell tower layer 204 are shown as being divided into three portions each in this example, the number of portions of the mobile phone layer 202 can be different than the number of portions of the cell tower layer 204 in different implementations. As shown, the controller server 102 assigns corresponding portions of the different layers to the same compute server. For example, in some implementations, the controller server assigns portion 202a of mobile phone layer and portion 204a of cell tower layer to compute server 104a, where the mobile phone agents 206 in layer portion 202a are serviced by cell tower agents 208 in layer portion 204a. Similarly, the controller server assigns mobile phone layer portion 202b and cell tower layer portion 204b to compute server 104b, where the mobile phone agents 206 in layer portion 202b are serviced by cell tower agents 208 in layer portion 204b; and assigns mobile phone layer portion 202c and cell tower layer portion 204c to compute server 104c, where the mobile phone agents 206 in layer portion 202c are serviced by cell tower agents 208 in layer portion 204c.

Upon receiving the layer portion assignments from the controller server 102, each of compute servers 104a, 104b and 104c instantiates simulation agent populations and managers corresponding to the respectively assigned layers. For example, compute server 104a creates a first simulation layer manager representing layer portion 202a and a second simulation layer manager representing layer portion 204a. The first simulation layer manager performs simulation tasks corresponding to the agents and related events in the layer portion 202a, while the second simulation layer manager performs simulation tasks corresponding to the agents and related events in the layer portion 204a. Similarly, compute servers 104b and 104c create separate simulation layer managers for their respective layer portions.

During the simulation process, the compute servers update the state of the simulation layer managers and/or agents in each time frame. For example, compute server 104a updates the state of the simulation layer managers and/or agents corresponding to layer portions 202a and 204a. The compute server updates the states of its simulation layer managers and/or agents by updating information exchanges between the agents 206 and 208 in its layer portions 202a and 204a, respectively, and updating the configurations of the agents, e.g., movement within the region covered by the layers.

Following the update, the compute servers gather that state information of their respective simulation agents into messages, and send those messages to other compute servers involved in the simulation, to synchronize the states of the various layers across the compute servers. In some implementations, a compute server sends the state update messages to all other compute servers in the simulation. For example, in such cases, compute server 104a sends state update messages to all other compute servers 104b, 104c and 104x that are involved in the simulation.

In some implementations, a compute server sends the state update messages to other compute servers across a shared border in the simulation space. For example, considering the simulation example described above with respect to FIGS. 2A and 2B, the layer portions 202a and 204a implemented by compute server 104a share borders with respective layer portions 202b and 204b, and 202c and 204c, implemented by respective compute servers 104b and 104c. In this case, compute server 104a sends state update messages to compute servers 104b and 104c, but not to other compute servers, e.g., compute server 104x, that may be involved in the simulation. FIG. 2B shows sharing of state information for the layers with shared borders. As shown, the compute server 104a shares the state information for the simulation agents for layer portions 202a and 204a with the compute servers 104b and 104c. Similarly, compute server 104b shares the state information for the simulation agents for layer portions 202b and 204b with the compute servers 104a and 104c, while compute server 104c shares the state information for the simulation agents for layer portions 202c and 204c with the compute servers 104b and 104a.

In some implementations, agent data can be shared from its controlling compute server to other compute servers or to a client device, in response to a request referred to as a "subscription." A subscription allows a given compute server or client device to receive updates about a particular agent or range of agents, from whichever compute server currently controls the particular agent or range of agents, regardless of proximity or border geometry in simulation space. A subscription can be established in compute server code or upon request by a connected client.

In some implementations, a compute server further divides each layer portion into a plurality of cells, and shares state information of the agents in the cells that are in a region of the layer portion referred to as a "frontier." In this context, the frontier is a configurable distance from any shared border within which a compute server provides updates to adjacent compute servers. The frontier varies from one layer to another, being a function of the effective reach of agents in a layer portion into other layer portions. For example, a mobile phone in layer 202a can have limited effect on operations of mobile phones in layer portions 202b or 202c. In such cases, the compute server 104a determines the frontier of layer portion 202a to include only a small number of border cells, represented by cells 210, that have mobile phones affecting layer portions 202b and 202c, and shares state information of these cells with compute servers 104b and 104c. On the other hand, a cell tower anywhere in layer portion 204a can communicate with cell towers in layer portions 204b or 204c. In such cases, the compute server 104a determines the frontier of layer portion 204a to include all cells in the layer portion, represented by cells 212, and shares state information of these cells with compute servers 104*b* and 104*c*.

When updating the state of respective simulation layer managers and/or agents, a compute server considers the state information received from other compute servers in the prior time frame. For example, the state of a cell tower agent in layer portion 204*b* can be affected by a cell tower agent in layer portion 204*a*. Accordingly, upon receiving the state information for layer portion 204*a* from compute server 104*a*, the compute server 104*b* considers the received state information when it updates the state of its simulation layer managers and/or agents corresponding to the layer portion 204*b* in the next time frame. In this manner, each compute server has a global view of the simulation environment, and it updates the state of the respective portion of the simulation environment created by the compute server by considering states of other portions managed by other compute servers.

In some implementations, the distributed computing framework provided by system 100 uses a deterministic randomizer to drive the simulation layer managers and/or agents in the compute servers. The randomizer provides natural variety in the behavior of the simulated environment, while the determinism in the randomizer ensures that every run of a simulation produces same results at a given time frame. In some implementations, the deterministic effect is achieved by having each of the compute servers 104*a*-104*x* update the state of respective simulation layers managers and/or agents on exactly the same data in exactly the same order in each run of a simulation. Enabling the determinism in the randomizer allows a user to keep initial conditions constant, but make strategic changes while the simulation is running, with higher confidence that new outcomes in the simulation are driven by the user-initiated changes and not by chance. This also allows simulations to be shared and replayed or interacted with meaningfully.

Figure 3:
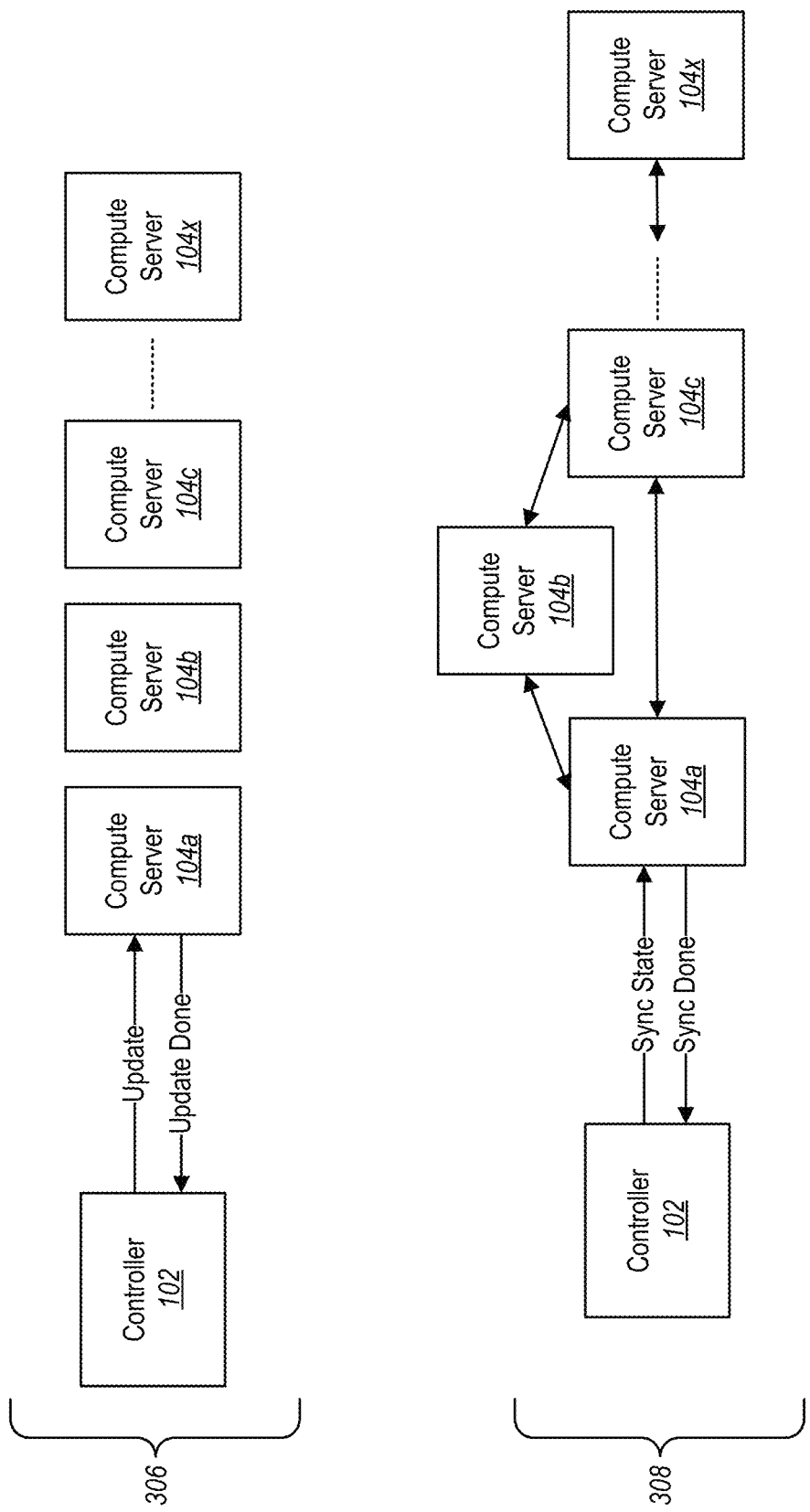
FIG. 3 illustrates an example of a state update and synchronization operation using a system-wide clock for a simulation performed on the distributed computing framework.

The distributed computing framework uses a global or system-wide clock for correct functioning of the deterministic randomizer. The controller server 102 maintains the system-wide clock, which is used coordinate state updates for the simulation layer managers and/or agents in the compute servers 104*a*-104*x*. FIG. 3 illustrates an example of a state update operation 306 and synchronization operation 308 using a system-wide clock for a simulation performed on the distributed computing framework of the system 100. In some implementations, the duration of a simulation in the distributed computing framework is divided into a series of discrete time steps or time frames, where a time frame corresponds to a clock tick of the system-wide clock. The example shown in FIG. 3 illustrates the operations performed in one time frame.

In some implementations, in each time frame, there is a work phase and a communication phase. The work phase corresponds to a state update operation, e.g., state update operation 306 shown in the time frame illustrated in FIG. 3, while the communication phase corresponds to a state synchronization operation, e.g., synchronization operation 308 in FIG. 3. As shown in FIG. 3, at the start of a time frame, for the state update operation 306, controller server 102 sends an "Update" instruction to the compute servers involved in the simulation, e.g., one or more of compute servers 104*a*-104*x*, to update the state of respective simulation layer managers and/or agents, and report back to the controller server 102. Following the instructions from the controller server, each compute server updates the states of respective simulation layer managers and/or agents, as described above, and sends an "Update Done" message to the controller server 102 to indicate completion of the update operations.

After receiving update completion reports from the compute servers, the controller server 102 performs the synchronization operation 308. For the synchronization operation, the controller server 102 sends a "Sync State" synchronization instruction to the compute servers involved in the simulation, e.g., one or more of compute servers 104*a*-104*x*, instructing the compute servers to share their respective state information across the frontier of their respective layers, e.g., as shown in FIG. 2B. Upon receiving the synchronization instruction, each compute server sends, to its neighboring compute servers, updated state information for respective simulation agents that affect the neighboring compute servers. For example, as discussed with respect to FIG. 2B, compute servers 104*a*, 104*b* and 104*c* share frontiers with one another, with simulation layer managers corresponding to layer portions of each compute server affecting simulation layer managers of layer portions of the other compute servers. Accordingly, each of compute servers 104*a*, 104*b* and 104*c* sends state information for cells in their respective frontier to the other two compute servers. Each compute server sends a "Sync Done" message to the controller server 102 to report completion of the state information exchange. After the synchronization operation 308 is complete, the controller server 102 waits until the next frame, when it initiates new state update and state synchronization operations.

In some implementations, during the communication phase, one or more of the compute servers send data to the client device 108, enabling visualization of the state of the simulation through the user interface on the client device. In some implementations, the data is sent to the client device at a lower frequency than the state update or state synchronization operations. For example, the system-wide clock can tick 10 times per second, which corresponds to 10 state update and synchronization operations per second. However, the compute server can send data to the client device 108 at a slower interval, e.g., two times per second, which helps to keep bandwidth requirements for communication with the client device 108 within a reasonable limit.

In some implementations, during the communication phase, one or more of the compute servers 104*a*-104*x* sends information, e.g., a summary, about agent population and server performance data for respective compute server, to the controller server 102. This summary data facilitates load balancing operations by the controller server 102. For example, the controller server 102 can perform load balancing when the summary population data indicates that one or more compute servers have become responsible for agent populations that are of a significantly different size than was specified at simulation start. As an illustrative example, a simulation of a city might have a commuter agent population that begins the day widely dispersed in suburbs, which then concentrates in the city center during the business day before dispersing back out to the suburbs at night. Layer region definitions that keep compute server populations balanced in the morning may result in one region accruing disproportionately many agents during the afternoon while the others are underpopulated. To prevent this outcome, upon receiving summary agent population data, the controller server 102 may repartition any imbalanced layers to equalize expected resource demands on each compute server. In some implementations, the controller server 102 does not need to explicitly assign agents to compute servers in this case. Compute servers actively manage agent populations during simulation, so the controller server 102 provides only new layer region definitions, and the compute servers transfer and synchronize agent populations accordingly.

In some implementations, the compute servers provide the summary information to the controller server 102 intermittently, e.g., once every 10 seconds or some other suitable time interval. In some implementations, the controller server 102 requires additional passage of time between adjustments to layer region definitions.

In the above manner, using periodic (e.g., every time frame) state update and synchronization operations using a system-wide clock, the distributed computing framework of system 100 realizes a deterministic randomizer to make simulations in the distributed computing framework repeatable and sharable, providing a stable concept of simulation history. The regular system-wide state snapshots using the state synchronization operations facilitate easy crash recovery and historical analysis. The simple and uniform structure of communications using the instructions and report messages between the controller server 102 and the compute servers 104a-104x makes the simulations portable while also allowing the distributed computing framework to be optimized around dense, regular messages that can be sent and processed efficiently.

As described above, simulations in the distributed computing framework involve multiple types of simulation layer managers corresponding to the different layers of the simulation environment. The simulation layer managers can span the entire simulation environment and which may require information about one another to operate. For example, considering the cellular communications network simulation described previously, a mobile phone agent in the mobile phone layer may require a nearby cell tower agent in the cell tower layer to call another mobile phone agent. The cell tower agent may require power from a utility grid layer, which may balance power availability in a realistic way to simulate the effects of interruptions in power supply.

The simulation layer managers and/or agents across compute servers interact with one another in each time frame based on the sharing of the state update information between the compute servers during the synchronization operation 308. As illustrated by the example above, the interactions among the simulation layer managers and/or agents can span across different types of simulation agents, e.g., between layer managers corresponding to different layers, and across compute servers, resulting in a high and relatively constant information dissemination requirements. In this manner, by distributing the state updates to all affected simulation layer managers across different compute servers, the distributed computing framework ensures that all simulation layer managers and/or agents have a consistent view of the simulation environment at all time frames during execution of a simulation.

By co-locating different layers in each of at least some compute servers, e.g., as described with respect to FIG. 2A, inter-layer interactions are simple and fast in the distributed computing framework. By making the simulations clock-driven, as opposed to event-driven simulations in conventional frameworks, highest-throughput and highest-frequency data in the general space of distributed simulations can be grouped and optimized in a straightforward manner. These features enable the distributed computing framework to handle very large numbers of agents that interact across multiple layers at high frequency, with a high speed connection to the client device. Accordingly, the distributed computing framework can handle simulations of significantly higher density, e.g., with much larger agent populations, and complexity, e.g., many more interactions among agents in the environment, compared to conventional simulation frameworks.

Figure 4:
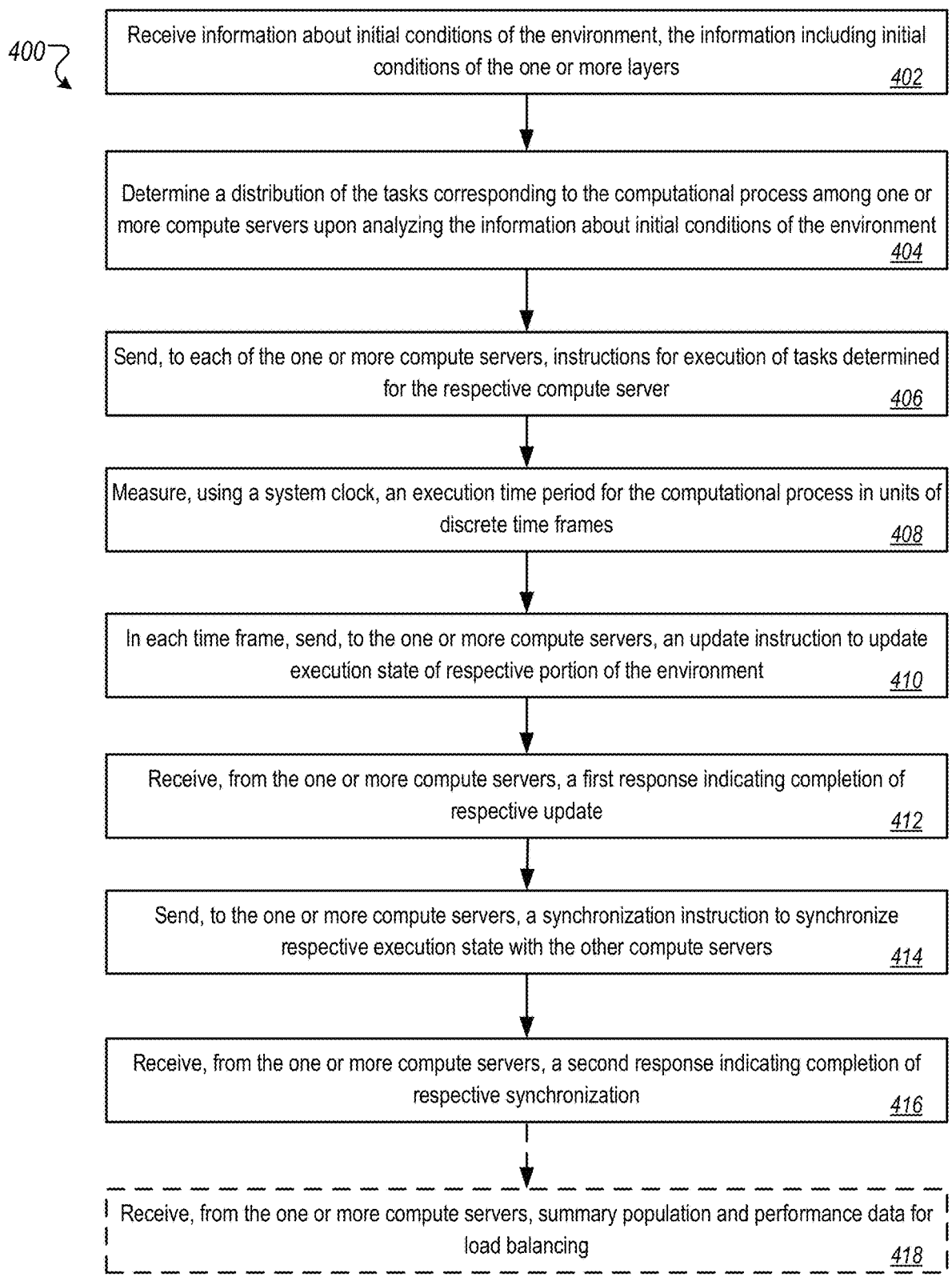
FIG. 4 illustrates an example of a process to perform massive scale simulations using a distributed computing framework.

FIG. 4 illustrates an example of a process 400 to perform massive scale simulations using a distributed computing framework. In some implementations, the process 400 is performed by the controller server 102 in the distributed computing framework of the system 100, to coordinate execution of tasks for simulations performed using the distributed computing framework. Accordingly, the following sections describe the process 400 with respect to the controller server 102. However, the process 400 also may be performed by other devices.

The process 400 starts when the controller server receives information about initial conditions of the environment, the information including initial conditions of the one or more layers (402). For example, the controller server 102 receives messages 107 from the seed node, the messages including information about initial conditions for one or more layers of the environment to be represented by a simulation, e.g., layers 202 and 204 in the cellular communications network simulation.

The controller server determines a distribution of the tasks corresponding to the computational process among one or more compute servers upon analyzing the information about initial conditions of the environment (404). For example, the controller server 102 analyzes the initial conditions specified by the messages 107, and determines a distribution of the simulation tasks among the compute servers 104a-104x. The distribution includes, for example, partitioning the layers 202 or 204, or both, into portions that are allocated to the compute servers. For example, the controller server 102 partitions mobile phone layer 202 into portions 202a, 202b and 202c, and allocates the portions to compute servers 104a, 104b and 104c, respectively.

The controller server sends, to each of the one or more compute servers, instructions for execution of tasks determined for the respective compute server (406). For example, the controller server 102 sends messages to the compute servers 104a-104c with instructions that specify the respective allocated layer portions, e.g., including information about the initial conditions of the respective agent populations.

The controller server measures, using a system clock, an execution time period for the computational process in units of discrete time frames (408). For example, during progress of the simulation, the controller server 102 keeps track of the time duration using the system-wide clock, measuring each interval of simulation progress in units of time frames, where a clock tick corresponds to a time frame.

In each time frame, the controller server sends, to the one or more compute servers, an update instruction to update execution state of respective portion of the environment (410). For example, in each time frame during the simulation, the controller server 102 performs a state update operation 306. For the state update operation, the controller server 102 sends an "Update" instruction to each of the one or more compute servers that are running simulation layer managers for the simulation, e.g., one or more of compute servers 104a-104x.

The controller server receives, from the one or more compute servers, a first response indicating completion of respective update (412). For example, after a compute server completes state update operations for its respective simulation layer managers and/or agents, the compute server sends an "Update Done" message to the controller server 102, indicating completion of the respective state update operation.

The controller server sends, to the one or more compute servers, a synchronization instruction to synchronize respective execution state with the other compute servers (414). For example, after receiving completion reports for the state update operations from all the compute servers involved in the simulation, the controller server 102 performs the synchronization operation 308. In this operation, the controller server 102 sends a "Sync State" instruction to each of the one or more compute servers that are running simulation layer managers for the simulation, e.g., one or more of compute servers 104*a*-104*x*.

The controller server receives, from the one or more compute servers, a subsequent response indicating completion of respective synchronization (416). For example, after a compute server shares its updated state information with one or more other compute servers upon receiving the synchronization instruction from the controller server, the compute server sends a "Sync Done" message to the controller server 102, indicating completion of the respective synchronization operation.

Optionally, the controller server receives, from the one or more compute servers, summary population and performance data for load balancing (418). For example, in some implementations, the controller server 102 receives, from each of one or more of the compute servers at intermittent time intervals, a performance message that includes a summary of the agent population at the respective compute server and corresponding performance data. The controller server 102 uses the population and performance information to determine a load balancing strategy for the simulation, for example, to achieve a balanced distribution of tasks across the compute servers. For example, using the population information, the controller server 102 can decide to reassign one or more agents from a compute server that has an excess number of agents, to a compute server that can accommodate additional agents, to create a more even distribution of tasks. Additionally or alternatively, using the performance data, the controller server 102 can decide to reassign one or more agent tasks from a compute server that has a greater share of tasks (for example, causing the compute server to be overloaded or unbalanced) to a compute server that is handling comparatively fewer tasks and can accommodate additional tasks without performance degradation. As noted above, receiving this population and performance data by the controller server is optional and may be present in some implementations.

Figure 5:
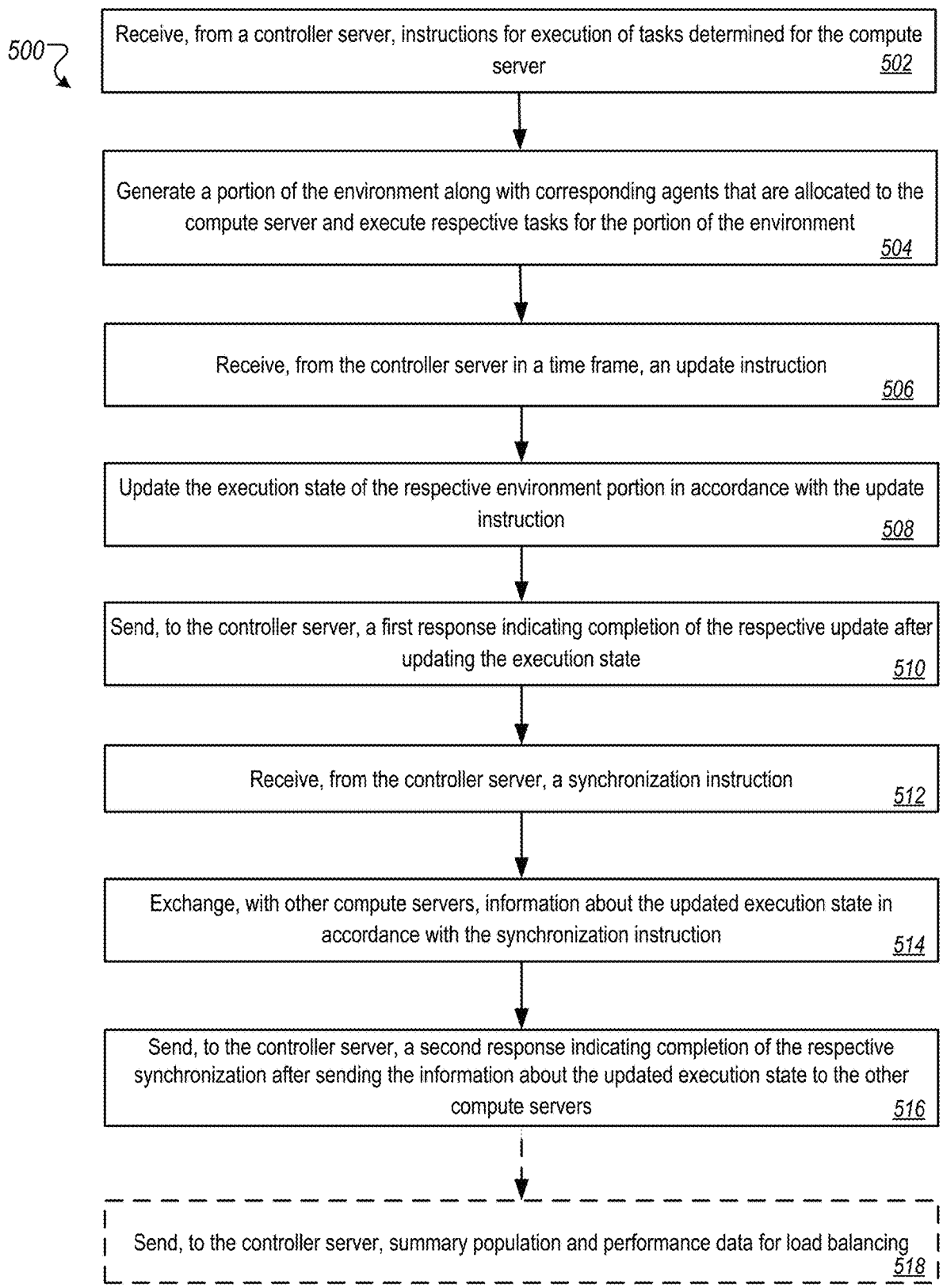
FIG. 5 illustrates an example of another process to perform massive scale simulations using a distributed computing framework.

FIG. 5 illustrates an example of another process 500 to perform massive scale simulations using a distributed computing framework. In some implementations, the process 500 is performed by one or more of the compute servers 104*a*-104*x* in the distributed computing framework of the system 100, to execute tasks for simulations performed using the distributed computing framework. Accordingly, the following sections describe the process 500 with respect to the compute servers 104*a*-104*x*. However, the process 500 also may be performed by other devices. In some implementations, the process 500 is performed by one or more of the compute servers 104*a*-104*x* in conjunction with the process 400 performed by the controller server 102 during a simulation in the distributed computing framework.

The process 500 starts when a compute server receives, from a controller server, instructions for execution of tasks determined for the compute server (502). For example, the compute server 104*a* receives, from the controller server 102, information about allocation of the layer portions 202*a* and 204*a* for the cellular communications network simulation. The information includes initial conditions for the allocated portions, e.g., geographic coordinates of each layer, neighboring compute servers, number and placement of agents in each layer, among others.

The compute server generates a portion of the environment along with corresponding agents that are allocated to the compute server and executes respective tasks for the portion of the environment (504). For example, the compute server 104*a* performs operations to create simulation layer managers for portion of the environment allocated to the compute server, such as a simulation layer manager for the mobile phone layer portion 202*a* having the mobile phone agents 206 and another simulation layer manager for the cell tower layer portion 204*a* having the cell tower agents 208. The compute server performs additional operations to execute tasks for the respective simulation layer managers, e.g., exchange of communications between the mobile phone agents and the cell tower agents, or movement of the mobile phone agents, among others.

The compute server receives, from the controller server in a time frame, an update instruction (506). For example, during the simulation, in each time frame, each of the one or more compute servers that are running simulation layer managers for the simulation, e.g., compute server 104*a*, receives an "Update" instruction from the controller server 102 during a state update operation 306, to update states of respective simulation layer managers and/or agents.

The compute server updates the execution state of the respective environment portion in accordance with the update instruction (508). For example, upon receiving the state update instruction from the controller server 102, the compute server 104*a* performs operations to update the states of respective simulation layer managers and/or agents, such as simulation layer managers and/or agents for the mobile phone layer portion 202*a* and the cell tower layer portion 204*a*.

The compute server sends, to the controller server, a first response indicating completion of the respective update after updating the execution state (510). For example, upon completion of the operations to update execution states of the respective simulation layer managers and/or agents, the compute server 104*a* sends an "Update Done" message to the controller server 102, reporting completion of the state update operation at the compute server 104*a*.

The compute server receives, from the controller server, a synchronization instruction (512). For example, after sending the state update completion report to the controller server in a time frame, each of the one or more compute servers that are running simulation agents for the simulation, e.g., compute server 104*a*, receives a "Sync State" instruction from the controller server 102 during a synchronization operation 308, to share update state information of respective simulation agents with other compute servers.

The compute server exchanges, with other compute servers, information about the updated execution state in accordance with the synchronization instruction (514). For example, upon receiving the synchronization instruction from the controller server 102, the compute server 104*a* sends information to one or more other compute servers with which it shares frontiers of the mobile phone layer portion 202*a* and the cell tower layer portion 204*a*, e.g., compute servers 104*b* and 104*c*. The information includes updated state information for the agents falling within the respective layer frontiers for the mobile phone layer portion 202*a* and the cell tower layer portion 204*a*. During the synchronization operation, the compute server 104a also receives, from the other compute servers with shared frontiers, e.g., compute servers 104b or 104c or both, updated state information about their respective agents. In some implementations, during the synchronization operation, a compute server, e.g., compute server 104a, also sends state update information to the client device 108. In some implementations, a compute server may additionally send aggregate layer population data to the controller server 102, to facilitate load balancing.

The compute server sends, to the controller server, a subsequent response indicating completion of the respective synchronization after sending the information about the updated execution state to the other compute servers (516). For example, upon completion of the state update information exchange with other compute servers, the compute server 104a sends a "Sync Done" message to the controller server 102, reporting completion of the synchronization operation at the compute server 104a.

Optionally, the compute server sends, to the controller server, summary population and performance data for load balancing (518). For example, in some implementations, a compute server, such as compute server 104a, sends to the controller server 102, at intermittent time intervals, a performance message that includes a summary of the agent population at the compute server and corresponding performance data. As described previously with respect to the process 400, the controller server 102 uses the population and performance information received from the various compute servers to determine a load balancing strategy for the simulation. As noted above, sending this population and performance data from a compute server to the controller server is optional and may be present in some implementations.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A system comprising:
a seed node that generates initial conditions for a computational process representing an environment having one or more layers, each layer of the one or more layers including agents sharing a common characteristic that is different from characteristics shared by agents in other layers;
one or more compute servers that are communicably coupled to one another, each compute server of the one or more compute servers executing tasks to generate a portion of the environment; and
a controller server that is communicably coupled to the seed node and the one or more compute servers, the controller server performing operations comprising:

receiving, from the seed node, information about initial conditions of the environment, the information including initial conditions of the one or more layers;

analyzing the information about initial conditions of the environment;

in response to the analysis, determining a distribution of the tasks corresponding to the computational process among the one or more compute servers;

sending, to each compute server of the one or more compute servers, instructions for execution of tasks corresponding to a respective portion of the environment determined for the respective compute server;

measuring, using a system clock, an execution time period for the computational process, wherein the execution time period is measured in units of discrete time frames;

determining start of each time frame;

at the start of each time frame, sending, to each of the one or more compute servers, an update instruction to update execution state of respective portion of the environment;

receiving, from each of the one or more compute servers, a first response indicating completion of respective update;

upon receiving a first response from each of the one or more compute servers, sending, to each of the one or more compute servers, a synchronization instruction to synchronize state of respective portion of the environment with other compute servers; and receiving, from each of the one or more compute servers, a subsequent response indicating completion of respective synchronization, wherein the operations by the controller server generate, at a known stage of the computational process and in each iteration of the computational process, an identical result that is independent of a sequential order of receiving the first responses or the subsequent responses from the one or more compute servers.

2. The system of claim 1, wherein the operations comprise determining the distribution of the tasks among the one or more compute servers to create the one or more layers of the environment, and wherein each of the one or more compute servers is configured to generate portions of the one or more layers of the environment along with corresponding agents allocated to each respective compute server.

3. The system of claim 1, wherein the controller server is further configured to perform operations comprising:

during runtime of the computational process, determining a redistribution of the tasks among the one or more compute servers; and sending, to each compute server of the one or more compute servers, updated instructions for execution of updated tasks determined for the respective compute server in accordance with the redistribution.

4. The system of claim 1, wherein a compute server of the one or more compute servers is configured to perform operations comprising:

receiving, from the controller server, the instructions for execution of tasks determined for the compute server;

generating portions of one or more layers of the environment along with corresponding agents that are allocated to the compute server, including executing tasks for the respective portions;

receiving, from the controller server at the start of each time frame, an update instruction;

updating execution state of the respective portions of the one or more layers of the environment in accordance with the update instruction;

upon updating the execution state, sending, to the controller server, a first response indicating completion of the respective update;

subsequent to sending the first response, receiving, from the controller server, a synchronization instruction;

in accordance with the synchronization instruction, sending, to one or more adjacent compute servers, information about the updated execution state; and upon sending the information about the updated execution state, sending, to the controller server, a subsequent response indicating completion of the respective synchronization.

5. The system of claim 4, wherein sending the information about the updated execution state to the one or more adjacent compute servers comprises:

for each layer portion of the portions of one or more layers generated by the compute server for respective portion of the environment, determining a frontier section of the layer portion having agents affecting one or more corresponding layer portions generated by the one or more adjacent compute servers; and sending information about the updated execution state of the frontier section to the one or more adjacent compute servers with affected corresponding layer portions.

6. The system of claim 5, wherein each layer portion generated by the compute server is divided into a plurality of cell regions, and wherein determining the frontier section of the layer portion comprises determining one or more cell regions of the plurality of cell regions having the agents affecting one or more corresponding layer portions generated by the one or more adjacent compute servers.

7. The system of claim 5, wherein a frontier section of a first layer portion generated by the compute server is different in size than a frontier section of a second layer portion generated by the compute server.

8. The system of claim 4, wherein a compute server of the one or more compute servers is configured to perform operations further comprising:

sending, to the controller server, a summary message that includes information about at least one of a population of agents at the respective compute server, or data about server performance of the respective compute server.

9. The system of claim 8, wherein the controller server performs operations further comprising:

receiving, from the one or more compute servers, respective summary messages;

analyzing the summary messages to determine load statuses of the one or more compute servers; and in response to determining that the load statuses of the one or more compute servers are unbalanced, reallocating at least one of agents or tasks from a particular compute server with a greater share of agents or tasks compared to other compute servers, to one or more of the other compute servers.

10. The system of claim 9, wherein determining that the load statuses of the one or more compute servers are unbalanced comprises determining at least one of:

the population of agents at the particular compute server is greater than a threshold number allowed to a compute server for efficient operation, the population of agents at the particular compute server is greater by more than a threshold number compared to the population of agents at the other compute servers, or the server performance of the particular compute server is less than a threshold level.

11. The system of claim 1, wherein each compute server of the one or more compute servers has a same view of the environment during the execution time period as the other compute servers.

12. The system of claim 1, wherein the portion of the environment generated by a compute server of the one or more compute servers includes at least a portion of one layer of the one or more layers, and wherein a number of portions of layers generated by a first compute server of the one or more compute servers is different than a number of portions of layers generated by a second compute server of the one or more compute servers.

13. The system of claim 1, further comprising a client device that is communicably coupled to one or more of the compute servers or the controller server, the client device providing a user interface enabling at least one of a visualization of the environment or interaction with the computational process during the execution time period.

14. The system of claim 13, wherein each of the one or more compute servers is configured to generate portions of the one or more layers of the environment along with corresponding agents, and wherein the operations further comprise:

receiving, from at least one of the client device or a particular compute server of the one or more compute servers, a subscription request for tracking a particular agent or a range of agents; and in response to the subscription request, enabling a tracker for the particular agent or the range of agents, wherein the client device or the particular compute server receives updates about the particular agent or the range of agents from a compute server that controls the particular agent or range of agents at the time of each update, independent of movement of the particular agent or range of agents across the environment among the one or more compute servers.

15. The system of claim 13, wherein a plurality of: the seed node, at least one of the one or more compute servers, the controller server, and the client device, are co-located in a geographic location.

16. The system of claim 13, wherein one or more of the seed node, at least one of the one or more compute servers, the controller server, and the client device are geographically distributed.

17. The system of claim 1, wherein generating the identical result that is independent of the sequential order of receiving the first responses or the subsequent responses from the one or more compute servers comprises:

generating by a compute server, a result of an update to the execution state of respective portion of the environment that is independent of an order or timing of receipt of synchronization messages from one or more other compute servers about a prior execution state of corresponding portions of the environment at the one or more other compute servers.

18. Non-transitory computer-readable media storing instructions that, when executed by one or more processors, are configured to cause a controller server to perform operations comprising:

receiving, from a seed node, information about initial conditions for a computational process representing an environment having one or more layers, wherein each layer of the one or more layers includes agents sharing a common characteristic that is different from characteristics shared by agents in other layers and the information includes initial conditions of the one or more layers;

analyzing the information about initial conditions of the environment;

in response to the analysis, determining a distribution of tasks corresponding to the computational process among one or more compute servers that are communicably coupled to one another, wherein each compute server of the one or more compute servers executes tasks to generate a portion of the environment;

sending, to each compute server of the one or more compute servers, instructions for execution of tasks corresponding to a respective portion of the environment determined for the respective compute server;

measuring, using a system clock, an execution time period for the computational process, wherein the execution time period is measured in units of discrete time frames;

determining start of each time frame;

at the start of each time frame, sending, to each of the one or more compute servers, an update instruction to update execution state of respective portion of the environment;

receiving, from each of the one or more compute servers, a first response indicating completion of respective update;

upon receiving a first response from each of the one or more compute servers, sending, to each of the one or more compute servers, a synchronization instruction to synchronize state of respective portion of the environment with other compute servers; and receiving, from each of the one or more compute servers, a subsequent response indicating completion of respective synchronization, wherein the operations generate, at a known stage of the computational process and in each iteration of the computational process, an identical result that is independent of a sequential order of receiving the first responses or the subsequent responses from the one or more compute servers.

19. The non-transitory computer-readable media of claim 18, wherein the operations comprise determining the distribution of the tasks among the one or more compute servers to create the one or more layers of the environment, and wherein each of the one or more compute servers is configured to generate portions of the one or more layers of the environment along with corresponding agents allocated to each respective compute server.

20. The non-transitory computer-readable media of claim 18, wherein the operations comprise:

during runtime of the computational process, determining a redistribution of the tasks among the one or more compute servers; and sending, to each compute server of the one or more compute servers, updated instructions for execution of updated tasks determined for the respective compute server in accordance with the redistribution.

21. The non-transitory computer-readable media of claim 18, wherein the instructions, when executed by the one or more processors, are configured to cause a compute server of the one or more compute servers to perform operations comprising:

receiving, from the controller server, the instructions for execution of tasks determined for the compute server;

generating portions of one or more layers of the environment along with corresponding agents that are allocated to the compute server, including executing tasks for the respective portions;

receiving, from the controller server at the start of each time frame, an update instruction;

updating execution state of the respective portions of the one or more layers of the environment in accordance with the update instruction;

upon updating the execution state, sending, to the controller server, a first response indicating completion of the respective update;

subsequent to sending the first response, receiving, from the controller server, a synchronization instruction;

in accordance with the synchronization instruction, sending, to one or more adjacent compute servers, information about the updated execution state; and upon sending the information about the updated execution state, sending, to the controller server, a subsequent response indicating completion of the respective synchronization.

22. The non-transitory computer-readable media of claim 21, wherein sending the information about the updated execution state to the one or more adjacent compute servers comprises:

for each layer portion of the portions of one or more layers generated by the compute server for respective portion of the environment, determining a frontier section of the layer portion having agents affecting one or more corresponding layer portions generated by the one or more adjacent compute servers; and sending information about the updated execution state of the frontier section to the one or more adjacent compute servers with affected corresponding layer portions.

23. The non-transitory computer-readable media of claim 22, wherein each layer portion generated by the compute server is divided into a plurality of cell regions, and wherein determining the frontier section of the layer portion comprises determining one or more cell regions of the plurality of cell regions having the agents affecting one or more corresponding layer portions generated by the one or more adjacent compute servers.

24. The non-transitory computer-readable media of claim 22, wherein a frontier section of a first layer portion generated by the compute server is different in size than a frontier section of a second layer portion generated by the compute server.

25. The non-transitory computer-readable media of claim 21, wherein the instructions, when executed by the one or more processors, are configured to cause a compute server of the one or more compute servers to perform operations further comprising:

sending, to the controller server, a summary message that includes information about at least one of a population of agents at the respective compute server, or data about server performance of the respective compute server.

26. The non-transitory computer-readable media of claim 25, wherein the instructions, when executed by the one or more processors, are configured to cause the controller server to perform operations further comprising:

receiving, from the one or more compute servers, respective summary messages;

analyzing the summary messages to determine load statuses of the one or more compute servers; and in response to determining that the load statuses of the one or more compute servers are unbalanced, reallocating at least one of agents or tasks from a particular compute server with a greater share of agents or tasks compared to other compute servers, to one or more of the other compute servers.

27. The non-transitory computer-readable media of claim 26, wherein determining that the load statuses of the one or more compute servers are unbalanced comprises determining at least one of:

the population of agents at the particular compute server is greater than a threshold number allowed to a compute server for efficient operation, the population of agents at the particular compute server is greater by more than a threshold number compared to the population of agents at the other compute servers, or server performance of the particular compute server is less than a threshold level.

28. The non-transitory computer-readable media of claim 18, wherein each compute server of the one or more compute servers has a same view of the environment during the execution time period as the other compute servers.

29. The non-transitory computer-readable media of claim 18, wherein the portion of the environment generated by a compute server of the one or more compute servers includes at least a portion of one layer of the one or more layers, and wherein a number of portions of layers generated by a first compute server of the one or more compute servers is different than a number of portions of layers generated by a second compute server of the one or more compute servers.

30. The non-transitory computer-readable media of claim 18, wherein each of the one or more compute servers is configured to generate portions of the one or more layers of the environment along with corresponding agents, and wherein the instructions, when executed by the one or more processors, are configured to cause a compute server of the one or more compute servers to perform operations comprising:

receiving, from at least one of a client device or a particular compute server of the one or more compute servers, a subscription request for tracking a particular agent or a range of agents, wherein the client device is communicably coupled to one or more of the compute servers or the controller server, the client device providing a user interface enabling at least one of a visualization of the environment or interaction with the computational process during the execution time period; and in response to the subscription request, enabling a tracker for the particular agent or the range of agents, wherein the client device or the particular compute server receives updates about the particular agent or the range of agents from a compute server that controls the particular agent or range of agents at the time of each update, independent of movement of the particular agent or range of agents across the environment among the one or more compute servers.

31. The non-transitory computer-readable media of claim 30, wherein a plurality of: the seed node, at least one of the one or more compute servers, the controller server, and the client device, are co-located in a geographic location.

32. The non-transitory computer-readable media of claim 30, wherein one or more of the seed node, at least one of the one or more compute servers, the controller server, and the client device are geographically distributed.

33. The non-transitory computer-readable media of claim 18, wherein generating the identical result that is independent of the sequential order of receiving the first responses or the subsequent responses from the one or more compute servers comprises:
generating by a compute server, a result of an update to the execution state of respective portion of the environment that is independent of an order or timing of receipt of synchronization messages from one or more other compute servers about a prior execution state of corresponding portions of the environment at the one or more other compute servers.

34. A method comprising:
receiving, at a controller server from a seed node, information about initial conditions for a computational process representing an environment having one or more layers, wherein each layer of the one or more layers includes agents sharing a common characteristic that is different from characteristics shared by agents in other layers and the information includes initial conditions of the one or more layers;
analyzing the information about initial conditions of the environment;
in response to the analysis, determining a distribution of tasks corresponding to the computational process among one or more compute servers that are communicably coupled to one another, wherein each compute server of the one or more compute servers executes tasks to generate a portion of the environment;
sending, to each compute server of the one or more compute servers, instructions for execution of tasks corresponding to a respective portion of the environment determined for the respective compute server;
measuring, using a system clock, an execution time period for the computational process, wherein the execution time period is measured in units of discrete time frames;
determining start of each time frame;
at the start of each time frame, sending, to each of the one or more compute servers, an update instruction to update execution state of respective portion of the environment;
receiving, from each of the one or more compute servers, a first response indicating completion of respective update;
upon receiving a first response from each of the one or more compute servers, sending, to each of the one or more compute servers, a synchronization instruction to synchronize state of respective portion of the environment with other compute servers; and
receiving, from each of the one or more compute servers, a subsequent response indicating completion of respective synchronization,
wherein an identical result is generated at a known stage of the computational process and in each iteration of the computational process, the identical result being independent of a sequential order of receiving the first responses or the subsequent responses from the one or more compute servers.

35. The method of claim 34, further comprising:
determining the distribution of the tasks among the one or more compute servers to create the one or more layers of the environment,
wherein each of the one or more compute servers is configured to generate portions of the one or more layers of the environment along with corresponding agents allocated to each respective compute server.

36. The method of claim 34, further comprising:
during runtime of the computational process, determining a redistribution of the tasks among the one or more compute servers; and
sending, to each compute server of the one or more compute servers, updated instructions for execution of updated tasks determined for the respective compute server in accordance with the redistribution.

37. The method of claim 34, further comprising:
receiving, from the controller server by a compute server of the one or more compute servers, the instructions for execution of tasks determined for the compute server;
generating portions of one or more layers of the environment along with corresponding agents that are allocated to the compute server, including executing tasks for the respective portions;
receiving, from the controller server at the start of each time frame, an update instruction;
updating execution state of the respective portions of the one or more layers of the environment in accordance with the update instruction;
upon updating the execution state, sending, to the controller server, a first response indicating completion of the respective update;
subsequent to sending the first response, receiving, from the controller server, a synchronization instruction;
in accordance with the synchronization instruction, sending, to one or more adjacent compute servers, information about the updated execution state; and
upon sending the information about the updated execution state, sending, to the controller server, a subsequent response indicating completion of the respective synchronization.

38. The method of claim 37, wherein sending the information about the updated execution state to the one or more adjacent compute servers comprises:
for each layer portion of the portions of one or more layers generated by the compute server for respective portion of the environment, determining a frontier section of the layer portion having agents affecting one or more corresponding layer portions generated by the one or more adjacent compute servers; and
sending information about the updated execution state of the frontier section to the one or more adjacent compute servers with affected corresponding layer portions.

39. The method of claim 38, wherein each layer portion generated by the compute server is divided into a plurality of cell regions, and wherein determining the frontier section of the layer portion comprises determining one or more cell regions of the plurality of cell regions having the agents affecting one or more corresponding layer portions generated by the one or more adjacent compute servers.

40. The method of claim 38, wherein a frontier section of a first layer portion generated by the compute server is different in size than a frontier section of a second layer portion generated by the compute server.

41. The method of claim 38, further comprising:
sending, to the controller server from a compute server of the one or more compute servers, a summary message that includes information about at least one of a population of agents at the respective compute server, or data about server performance of the respective compute server.

42. The method of claim 41, further comprising:
receiving, by the controller server from the one or more compute servers, respective summary messages;
analyzing the summary messages to determine load statuses of the one or more compute servers; and
in response to determining that the load statuses of the one or more compute servers are unbalanced, reallocating at least one of agents or tasks from a particular compute server with a greater share of agents or tasks compared to other compute servers, to one or more of the other compute servers.

43. The method of claim 42, wherein determining that the load statuses of the one or more compute servers are unbalanced comprises determining at least one of:
the population of agents at the particular compute server is greater than a threshold number allowed to a compute server for efficient operation,
the population of agents at the particular compute server is greater by more than a threshold number compared to the population of agents at the other compute servers, or
server performance of the particular compute server is less than a threshold level.

44. The method of claim 34, wherein each compute server of the one or more compute servers has a same view of the environment during the execution time period as the other compute servers.

45. The method of claim 34, wherein the portion of the environment generated by a compute server of the one or more compute servers includes at least a portion of one layer of the one or more layers, and
wherein a number of portions of layers generated by a first compute server of the one or more compute servers is different than a number of portions of layers generated by a second compute server of the one or more compute servers.

46. The method of claim 34, wherein each of the one or more compute servers is configured to generate portions of the one or more layers of the environment along with corresponding agents, and wherein the method comprises:
receiving, by a compute server of the one or more compute servers from at least one of a client device or a particular compute server of the one or more compute servers, a subscription request for tracking a particular agent or a range of agents, wherein the client device is communicably coupled to one or more of the compute servers or the controller server, the client device providing a user interface enabling at least one of a visualization of the environment or interaction with the computational process during the execution time period; and
in response to the subscription request, enabling a tracker for the particular agent or the range of agents,
wherein the client device or the particular compute server receives updates about the particular agent or the range of agents from a compute server that controls the particular agent or range of agents at the time of each update, independent of movement of the particular agent or range of agents across the environment among the one or more compute servers.

47. The method of claim 46, wherein a plurality of: the seed node, at least one of the one or more compute servers, the controller server, and the client device, are co-located in a geographic location.

48. The method of claim 47, wherein one or more of the seed node, at least one of the one or more compute servers, the controller server, and the client device are geographically distributed.

49. The method of claim 34, wherein generating the identical result that is independent of the sequential order of receiving the first responses or the subsequent responses from the one or more compute servers comprises:
generating by a compute server, a result of an update to the execution state of respective portion of the environment that is independent of an order or timing of receipt of synchronization messages from one or more other compute servers about a prior execution state of corresponding portions of the environment at the one or more other compute servers.

* * * * *